(12) United States Patent
Adams

(10) Patent No.: US 9,346,535 B1
(45) Date of Patent: May 24, 2016

(54) RING CAM AND RING CAM ASSEMBLY FOR DYNAMICALLY CONTROLLING PITCH OF CYCLOIDAL ROTOR BLADES

(71) Applicant: The United States of America, as represented by the Secretary of the Air Force, Washington, DC (US)

(72) Inventor: Zachary H. Adams, Franktown, CO (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 649 days.

(21) Appl. No.: 13/764,957

(22) Filed: Feb. 12, 2013

Related U.S. Application Data

(60) Provisional application No. 61/620,773, filed on Apr. 5, 2012, provisional application No. 61/755,982, filed on Jan. 24, 2013.

(51) Int. Cl.
  *B64C 11/30* (2006.01)
  *B64C 27/605* (2006.01)
  *F01D 5/12* (2006.01)
  (Continued)

(52) U.S. Cl.
  CPC .............. *B64C 11/30* (2013.01); *B64C 27/605* (2013.01); *B64C 39/005* (2013.01); *B64C 2027/7238* (2013.01); *B64C 2027/7255* (2013.01); *F01D 5/12* (2013.01)

(58) Field of Classification Search
  CPC ...... B64C 11/30; B64C 27/28; B64C 27/605; B64C 2027/8227; B64C 2027/7238; B64C 2027/7255; B64C 39/00; B64C 39/005; B64C 39/0025
  See application file for complete search history.

(56) References Cited

U.S. PATENT DOCUMENTS

| | | | |
|---|---|---|---|
| 1,432,700 A | | 10/1922 | Kirsten |
| 1,753,252 A | * | 4/1930 | Strandgren .............. B63H 1/04 416/108 |

(Continued)

OTHER PUBLICATIONS

Eric Parsons, Investigation and Characterization of a Cycloidal Rotor for Application to a Micro-Air Vehicle, MS Thesis, 2005.

(Continued)

*Primary Examiner* — Igor Kershteyn
(74) *Attorney, Agent, or Firm* — AFMCLO/JAZ; Jeff Moore

(57) ABSTRACT

A new ring cam and ring cam assembly, developed for providing more diverse dynamic pitching schedules for cyclorotor blades, particularly for providing both cyclic and collective pitch control, can be used for any apparatus where dynamic variation of cam controlled movement is needed. The new ring cam has its cam surface on the inside of a ring, the cam surface defining a plurality of different cam profiles which can be dynamically chosen and applied according to need. The different cam profiles are provided by different configurations and by combinations of those configurations. One configuration uses a plurality of adjacent different cam profiles across the inside width of the ring, so that a cam follower follows different cam profiles as it moves across or relative to the cam surface. Another configuration moves a center axis of the ring in relation to the axis of rotation of the cyclorotor, or other rotating device, to dynamically change the effective cam profile. Still another configuration rotates the ring to dynamically change the effective cam profile. The new ring cam assembly includes a cam follower which, for its originally developed use, is operatively interconnected with a cyclorotor blade.

12 Claims, 7 Drawing Sheets

(51) Int. Cl.
*B64C 27/72* (2006.01)
*B64C 39/00* (2006.01)

(56) References Cited

U.S. PATENT DOCUMENTS

| | | | | |
|---|---|---|---|---|
| 2,045,233 A | | 6/1936 | Kirsten et al. | |
| 2,123,916 A | * | 7/1938 | Rohrbach | B64C 39/005 244/20 |
| 2,413,460 A | * | 12/1946 | Main | B64C 39/005 244/9 |
| 2,501,315 A | * | 3/1950 | Christian | B64C 11/006 244/70 |
| 2,507,657 A | * | 5/1950 | Wiessler | B64C 39/005 244/15 |
| 2,580,428 A | * | 1/1952 | Heuver | B64C 39/005 416/111 |
| 3,426,982 A | * | 2/1969 | Markwood | B64C 27/28 244/17.19 |
| 3,554,662 A | * | 1/1971 | Lemont | B64C 27/605 416/1 |
| 4,194,707 A | * | 3/1980 | Sharpe | B64C 3/141 244/12.3 |
| 4,210,299 A | * | 7/1980 | Chabonat | B64C 39/005 244/20 |
| 4,507,049 A | * | 3/1985 | Strandgren | F03D 3/068 416/119 |
| 4,527,757 A | * | 7/1985 | Gonzales | B64C 39/008 244/19 |
| 5,009,571 A | | 4/1991 | Smit | |
| 5,100,080 A | | 3/1992 | Servanty | |
| 5,265,827 A | | 11/1993 | Gerhart | |
| 6,007,021 A | * | 12/1999 | Tsepenyuk | B64C 39/008 244/19 |
| 6,352,219 B1 | * | 3/2002 | Zelic | B64C 39/005 244/12.1 |
| 7,370,828 B2 | | 5/2008 | Stephens | |
| 8,540,485 B2 | * | 9/2013 | Bogrash | F03D 5/00 244/21 |
| 2007/0034737 A1 | | 2/2007 | Tierney | |

OTHER PUBLICATIONS

John B. Wheatley, Simplified Aerodynamic Analysis of the Cyclogiro Rotating-Wing System, National Advisory Committee of Aeronautics, No. 467, Aug. 1933.

* cited by examiner

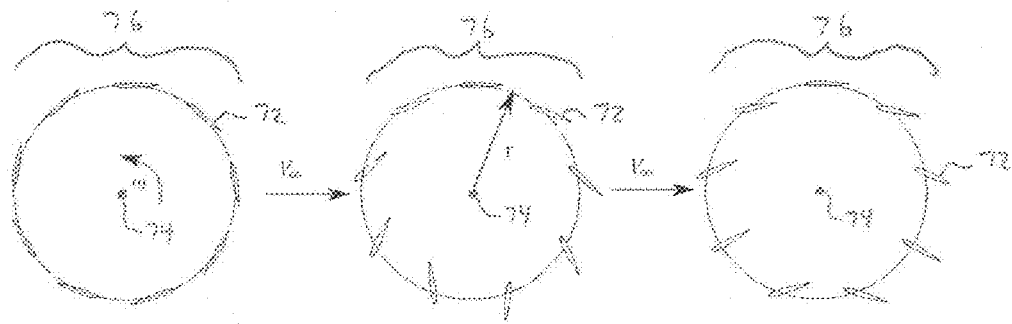
*FIG. 7a*  *FIG. 7b*  *FIG. 7c*
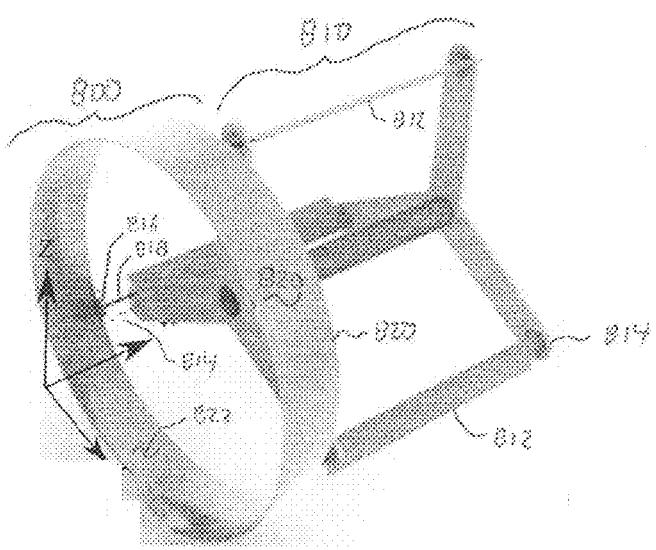
*FIG. 8*

RING CAM AND RING CAM ASSEMBLY FOR DYNAMICALLY CONTROLLING PITCH OF CYCLOIDAL ROTOR BLADES

CROSS REFERENCE TO RELATED PATENT APPLICATIONS

This application claims priority under 35 U.S.C. §119(e) from U.S. provisional application 61/620,773, filed Apr. 5, 2012, and titled "Mechanism for Altering Blade Pitch on a Cycloidal Rotor to Compensate for Increasing Advance Ratios." It also claims priority under 35 U.S.C. §119(e) from U.S. provisional application 61/755,982, filed Jan. 24, 2013, and titled "Ring Cam and Ring Cam Assembly for Dynamically Controlling Pitch of Cycloidal Rotor Blades." The invention descriptions contained in both provisional applications are incorporated by reference into this description.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to cycloidal rotors, and more specifically to a new ring cam and ring cam assembly for dynamically controlling the pitch of cyclorotor blades at diverse pitching schedules, and for use with any apparatus where dynamic variation of cam controlled movement is needed.

A cyclogyro is an aircraft capable of vertical takeoff and landing using a horizontal axis propulsion concept known as a cycloidal rotor, or cyclorotor. FIG. 1 shows a cyclogyro and cyclorotor proposed and patented (U.S. Pat. No. 2,123,916) in 1933 by Rohrbach, but never built.

Cyclorotors are characterized by the rotation of blades about an axis where the span of the blades is parallel to the axis of revolution of the cyclorotor and perpendicular to the direction of flight. Aerodynamic forces are generated by cyclically pitching the blades forward and back as they move around the rotational axis. The manner in which the blades pitch during a rotation is known as a "pitching schedule." For example, in a hovering flight condition, a positive pitch on the top portion of the cycle and a negative pitch on the bottom portion produce an upward force. By altering the pitching schedule, a cyclorotor can produce thrust in any direction perpendicular to its rotational axis.

A cyclorotor's ability to achieve higher aerodynamic efficiency and operate more quietly than traditional rotors, combined with an ability to nearly instantaneously manipulate both magnitude and direction of its thrust vector, as well as potentially optimize blade kinematics for every flight condition, makes it an attractive propulsion system for micro air vehicles (MAVs). Additionally, newer lightweight and high strength composite materials, combined with ongoing research and development, have begun to make cyclorotors practical for larger aircraft such as airships and vertical takeoff and landing (VTOL) aircraft. Many technical barriers, however, remain before cyclorotors can be practically implemented on any flying vehicle.

The problem is similar to that faced by the Wright brothers in solving the problem of controllable flight. The Wright brothers did not invent a winged airplane. They invented an apparatus and method for controlled flight for a winged airplane. Their solution was wing warping, later interpreted to include modern ailerons as functional equivalents.

A successful cyclorotor, for use in a successful cyclogyro, requires a solution similar to that of the Wright brothers. Central to that solution is development of a mechanism to produce required dynamic blade pitching kinematics.

The term dynamic is used to indicate varying cyclic control, usually controlled variation according to need, as opposed to a fixed cycle. For purposes of a cyclorotor, while the pitch of each cyclorotor blade is varied during a particular flight profile, that variation pattern typically is fixed. Dynamic control means that the variation pattern of blade pitch can be changed as needed for different flight profiles.

While the meanings of terms and terminology used for cyclogyros and cyclorotors is still evolving, and are often different from the meanings given for identical terms and terminology used for helicopters, a brief description of the meanings for cyclic pitch control and collective pitch control as applied to helicopter rotors and blades will make it easier to understand the meaning of the same terms as applied to cyclorotors.

The simplest helicopters use fixed pitch rotor blades. The amount of upward thrust is controlled entirely by the rotational speed of the rotor. However, by varying the pitch of each blade as it rotates, so that, for example, the pitch is reduced as the blades rotate toward the front of the helicopter, and is increased as the blades rotate toward the rear of the helicopter, the helicopter will tilt, or pitch (yet another meaning for the term "pitch"), forward, creating forward thrust. Similarly, if the pitch of the blades is reduced as they rotate toward the right side of the helicopter and the pitch is increased as they rotate toward the left side of the helicopter, the helicopter will tilt, or roll, toward the right, creating a thrust to the right. This type of pitch control, which varies in a fixed manner as the helicopter rotor blades cycle through a rotation, is called cyclic pitch control.

As just stated, for fixed pitch helicopter rotor blades, the amount of thrust is controlled by the rotational speed of the rotor. Even for cyclically controlled pitch helicopter rotors, the total thrust, while shared between up, forward or reverse and left or right, is mostly determined by the rotational speed. Collective pitch control changes the pitch of all the rotor blades at the same time in the same direction, thereby changing the total thrust, without having to change rotational speed, even while the blades may be undergoing cyclic pitch changes for pitch and roll.

The ability to dynamically control the pitch of helicopter rotor blades both cyclically and collectively was critical to the commercial success of helicopters.

While the meaning of cyclic pitch control and collective pitch control as used for cyclorotors may not yet be fixed, simple observation reveals that cyclic pitch control for a cyclorotor primarily changes the direction of thrust, and not pitch and roll as in a helicopter. Collective pitch control changes the magnitude of thrust. Changing the magnitude and direction of thrust on separate rotors can maneuver the vehicle.

The first free flying cyclorotor aircraft, or cyclogyro, was flown by a team at the University of Maryland in April 2011. Its four bar linkage pitch control can achieve only a cyclic pitch control, affecting in a cyclorotor the resulting direction of thrust, and not collective pitch control. Most cyclorotor research has concentrated on improving hovering efficiency, requiring only those pitching schedules achievable with a simple mechanical linkage. No pitch control apparatus has been developed to actuate and control the dynamic blade kinematics necessary for efficient forward flight.

Similar to understanding the meaning of cyclic and collective pitch control as used for helicopters helps understanding the importance of the same terms as used for cyclorotors, understanding the meaning, and history, of the term cycloidal will help understanding of cycloidal rotors.

As described, for example, in U.S. Pat. No. 2,580,428 to Heuver, the rotors on a cyclogyro are called cycloidal rotors, or propellers, because the path followed by the long axis of each rotor blade approximates a cycloid. A cycloid, as shown in FIG. 2, is the path 20 followed by a point 22 on a rotating circle 24. Because the blades are rotating about the rotor axis while the aircraft is also moving forward, their long axes will follow a pure cycloidal curve only if the rotor axis of rotation advances a distance during a single rotation equal to the circumference of the rotor, or Pi times its diameter. This translation advance per revolution of the rotor is conventionally called pitch.

It is important to recognize that the conventional use of the term pitch, how far an aircraft propeller or a ship's screw moves forward during one complete revolution, while useful to traditional propeller designers, is not used for cyclorotors.

The technical definition of pitch for cyclorotors refers to the angle the chord of each individual cyclorotor blade makes with a line tangent to the blade's path around a cyclorotor's axis of rotation.

For forward motion to occur, each blade must follow a so-called prolate cycloid path, where a point on a circle, or the long axis of a rotor blade about the rotor axis, will follow a path greater than Pi times the rotor diameter. An example of a prolate cycloid path 30 is shown in FIG. 3, where a circle 32 representing a rotor is mounted concentrically on a larger circle 34 which rolls along a plane surface 36.

FIG. 4 is an example of a so-called curate cycloid path 40, where a point 42 is on a circle representing the circumference of a rotor and where the circle has a greater diameter than a circle 44 rolling along a plane surface 46.

FIGS. 2, 3 and 4 are modified from images available at the Wolfram MathWorld web site, and are used with sincere thanks. The descriptions of which path is a curate cycloid path and which a prolate cycloid path at the Wolfram MathWorld web site, the arbiter for standard math usage, may, in fact, more accurately be reversed when applied to cyclorotors, and are presented here only for background.

It's important to note that curtate and prolate advance ratios describe a desired overall result, and not how to achieve that result. How to achieve that result is the problem the prior art has sought to solve.

A three-bladed cyclorotor 50 is shown in FIG. 5. As described earlier, cyclorotors are characterized by the rotation of blades 52 about a horizontal axis where the span 54 of the blades is parallel to the axis of revolution 56 and perpendicular to the direction of flight 58. Also as described earlier, forces are generated by cyclically pitching the blades as they move around the rotational axis so that, for example, in a hover, a positive pitch on the top half of the cycle and a negative pitch on the bottom half produces an upward force. By varying amplitude and phasing of cyclic pitching magnitude, the direction of thrust can be varied.

The cyclogyro flown at the University of Maryland in 2011 used the blade pitching mechanism shown in FIG. 6. A link 62 connects an offset eccentric ring 64 to the aft end of each blade 66. Eccentric ring 64 is offset from the rotational axis of the cyclorotor at a fixed distance, but can be rotated by a servo to change the phase of the blade pitching and thereby the direction of thrust. In effect, these rotors have cyclic, but not collective, pitch control. The magnitude of thrust is varied only through the rotational speed of the rotors.

A detailed description of the operating principals of cycloidal rotors, including a discussion of prior art attempted solutions, is found in *Investigation and Characterization of a Cycloidal Rotor for Application to a Micro-Air Vehicle*, Eric Parsons, M.S. Thesis, University of Maryland (2005), which is incorporated by reference into this description.

Even though the University of Maryland control strategy is simple and reliable, it is inherently limited. Most significantly, it cannot provide the range of blade kinematics required for efficient forward flight, which must include both cyclic and collective pitch control. Additionally, as forward velocity increases, the pitching kinematics of the blades must change significantly to account for an additional horizontal component of flow. The existing blade pitch control strategy shown in FIG. 6, even if collective pitch control were added, does not permit such pitching schedules.

The need for pitching schedule complexity results, at least in part, from the relative direction of flow on each blade. Similar to conventional rotors, this is determined by velocity due to rotor rotation, the free stream velocity, and velocity due to inflow. The advance ratio $\mu$, as shown in equation (1), is the ratio of free stream velocity to the velocity due to rotation, and is the driving representation of these velocity components. The forces on each blade are dependent on the angle of attack of the blade which, in turn, is determined by the relative direction of flow. Thus, the desired pitching schedule is a function of this ratio.

$$\mu = \frac{V_\infty}{\Omega r} \quad (1)$$

FIGS. 7a-7b show snapshots of an airfoil 72 aligned with the relative flow as it travels counterclockwise around the rotational axis 74 of a cyclorotor 76 at advance ratios of zero (a), one (b) and two (c). Advance ratios less than one are referred to as curtate advance ratios while those greater than one are referred to as prolate advance ratios. An advance ratio of one, where the velocity from rotation is equal to the free stream velocity, is a cycloid. Advance ratios near one are unusual as a 180 degree blade pitching change is necessary (near the bottom of the rotation) as the blade retreats and the flow direction relative to the blade changes. The flight criterion to operate at prolate advance ratios demands that the pitch schedule of a blade needs to monotonically increase throughout the cycle of a revolution from $\phi=0, 2\pi, 4\pi, \ldots m/\pi$, where m is the number of revolutions. This blade motion simply aligns the blade chord with the flow, so that to produce force the blades must be pitched cyclically relative to these zero angle of attack positions.

As previously described in relation to FIG. 6, traditional control mechanisms pitch the blade by attaching control rods or links from the blade to a rotating eccentric ring. By varying the position of the eccentric ring, the blades are pitched in an approximately sinusoidal manner with variable amplitude and phase. This sinusoidal pitching schedule, however, cannot efficiently compensate for increasing free stream velocities because the fraction of rotation at which the pitch of the blades can be optimized decreases with increasing advance ratio as the optimum pitching schedule becomes non-sinusoidal. Thus, these mechanisms are limited to operation at low curtate advance ratios.

Pitching schedules that more accurately account for incoming flow direction will be more efficient at all advance ratios because the pitch of the blades can always be optimized. However, no mechanism has been developed to produce all necessary pitching schedules. The Parsons M.S. thesis includes a suggestion to use multiple cams or to control each blade individually. However, multiple cam mechanisms are extremely complicated and are only efficient at specific advance ratios, while individual blade control by electronics or hydraulics is impractical at high rotational speeds because the necessary large blade rotational accelerations cannot be achieved with the speed and magnitude required.

There is, therefore, a need for new apparatus and methods that can dynamically control the pitch of cyclorotor blades, particularly for producing diverse pitching schedules.

Such new apparatus and methods should be able to provide not only cyclic and collective pitch control, but control blade pitch to optimize for the direction of flow over the blades.

Such new apparatus and methods must also be able to provide actuation forces sufficient to achieve the necessary blade rotational accelerations.

A solution for the problems of dynamic control of cyclorotor blades will reveal similar needs for new apparatus and methods for dynamically controlling other moving apparatus parts.

SUMMARY OF THE INVENTION

The present invention solves the problems of dynamically controlling cyclorotor blade pitch at diverse pitching schedules to enable the range of curtate and prolate advance ratios needed for a successful cyclogyro aircraft.

It can provide both cyclic and collective pitch control, as well as pitch control optimized for the direction of flow over cyclorotor blades.

A key feature of a primary embodiment according to the teachings of the present invention is a new ring cam having its cam surface, defining a cam profile, on the inside of the ring.

A traditional cam has only a single profile, able to produce only a single repeating movement of the mechanism it controls.

The teachings of the present invention, and its primary ring cam and ring cam assembly example embodiments, includes providing a plurality of dynamically varying cam profiles. It does so using several different configurations, separately and in combination, as shown in the described example embodiments.

A first configuration has an inside cam surface shaped to define a plurality of adjacent different cam profiles, so that a particular cam profile can be selected by moving a cam follower in and out across the inside cam surface. The cam follower is operatively connected to a cyclorotor blade to vary its pitch and thus dynamically change advance ratios.

A second configuration moves the center axis of the ring cam horizontally or vertically, or both, in relation to the rotational axis of the cyclorotor, to vary the effective cam profile.

A third configuration rotates the ring cam to vary the effective cam profile.

In an example embodiment according to the teachings of the present invention, the cam follower comprises a cam bearing connected to a cyclorotor blade such that its axis of rotation is behind the axis of rotation of the cyclorotor blade. Up and down movements of the cam follower then vary the pitch of the blade. Centrifugal force from the rotation of the cyclorotor forces the cam follower against the inside of the cam, usually sized slightly larger than the rotor.

An important advantage of the present invention is that it allows a cyclogyro to increase or decrease its speed by varying the cam profile and not merely by rotating the cyclorotor faster or slower. In this manner, a cyclorotor can provide the advantages of a conventional variable pitch propeller, which can be operated at more engine efficient near constant speeds, while at the same time providing, in addition to variable thrust, variable lift.

As described in the Background, another important advantage is that, once this solution for cyclorotor blades is demonstrated, it will quickly find other valuable uses.

These and other features and advantages will become apparent in the following description.

BRIEF DESCRIPTION OF THE DRAWINGS

The teachings of the present invention will be better understood from the following drawings illustrating various aspects and example embodiments of the invention and its teachings.

FIGS. 7a-7c demonstrate advance ratios of zero (a), one (b) and two (c).

FIG. 8 shows an example embodiment of a ring cam assembly according to the teachings of the present invention.

DETAILED DESCRIPTION

FIG. 8 shows an example embodiment of a ring cam assembly 800, according to the teachings of the present invention, for providing a plurality of dynamically varying non-sinusoidal blade pitching schedules for a cyclorotor 810.

Figure 1:
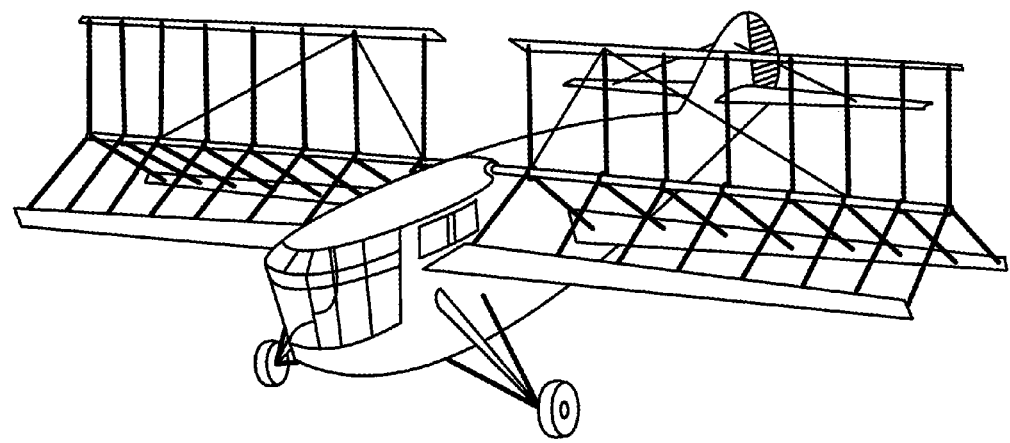
FIG. 1 shows an example prior art cyclorotor concept, a Rohrback cyclogyro in 1933.
Figure 2:
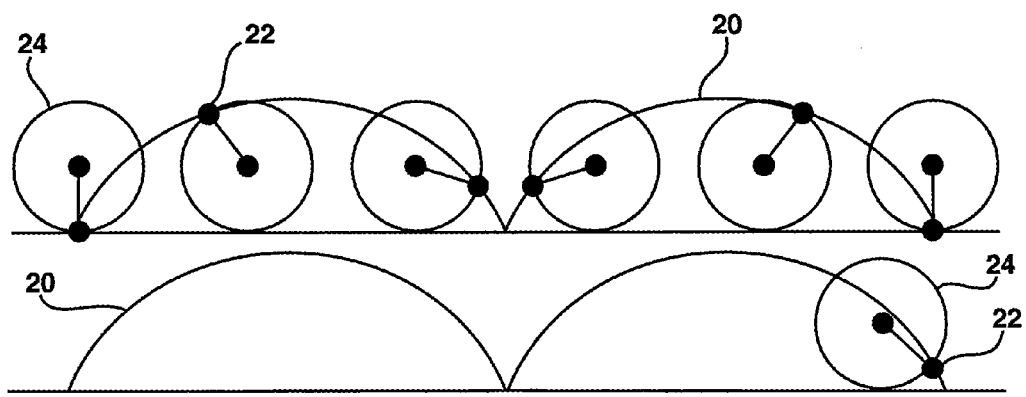
FIG. 2 is a graphical representation of cycloidal motion or a cycloid path.
Figure 3:
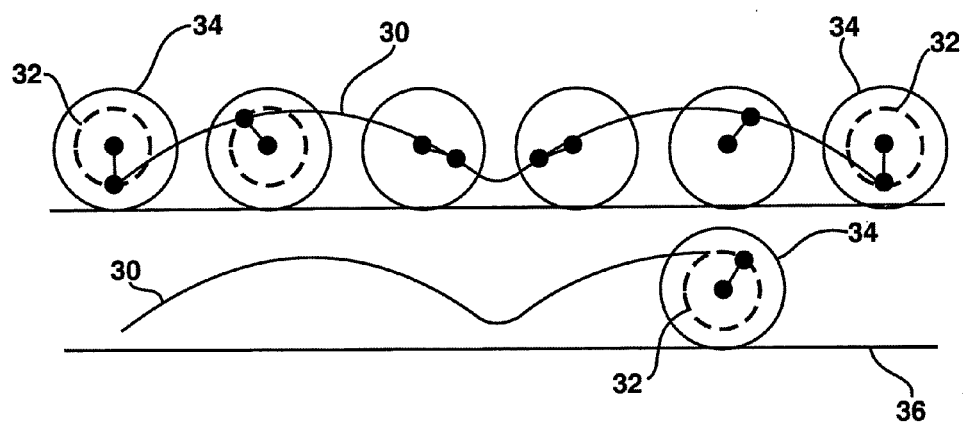
FIG. 3 is a graphical representation of a curate cycloid path.
Figure 4:
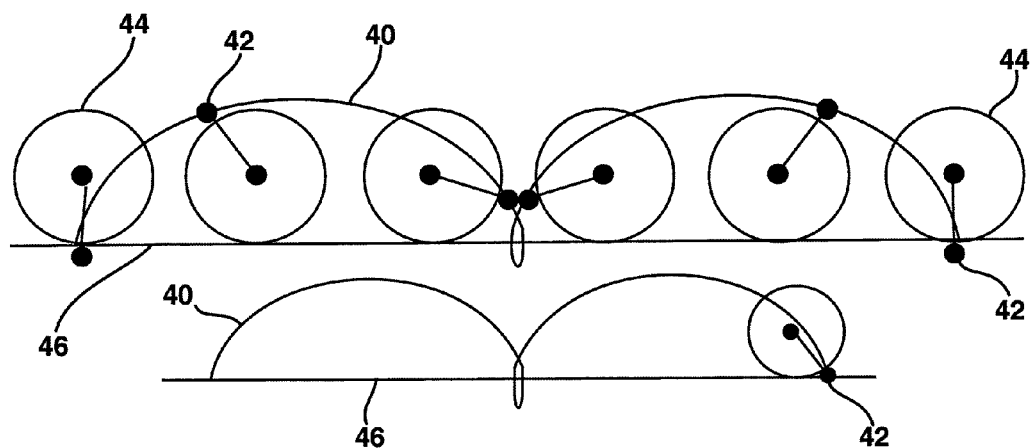
FIG. 4 is a graphical representation of a prolate cycloid path.
Figure 5:
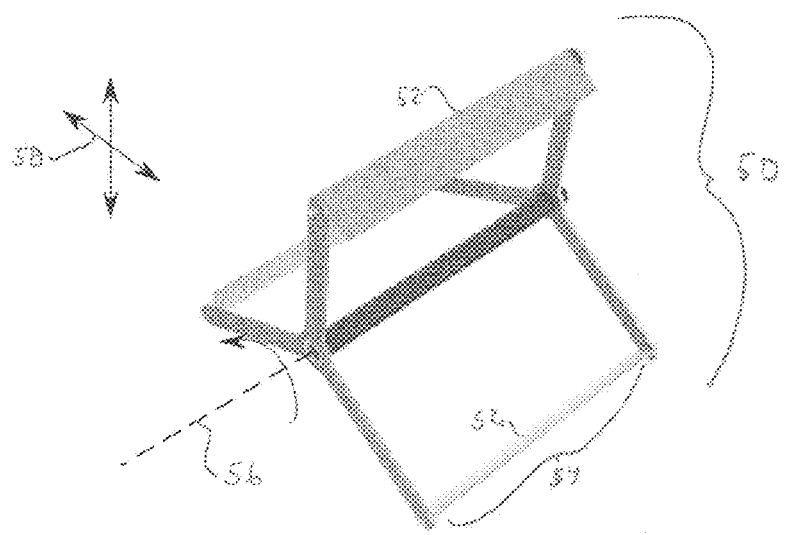
FIG. 5 shows an example generic cyclorotor and cyclorotor blades.
Figure 6:
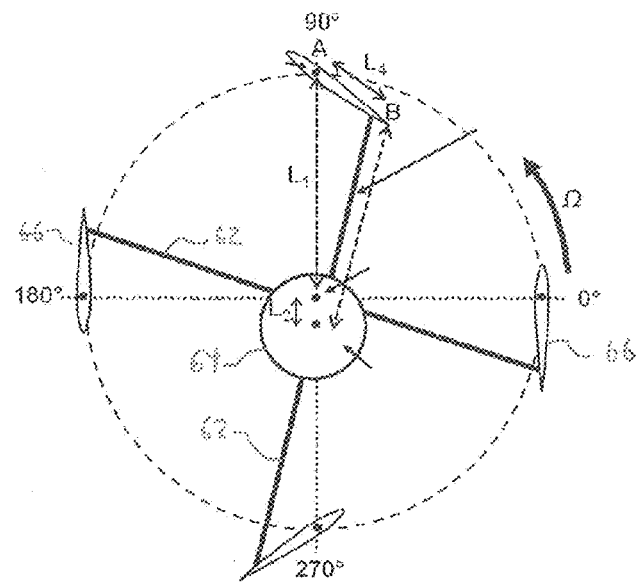
FIG. 6 shows an example prior art blade pitching apparatus using an offset eccentric ring.
Figure 9:
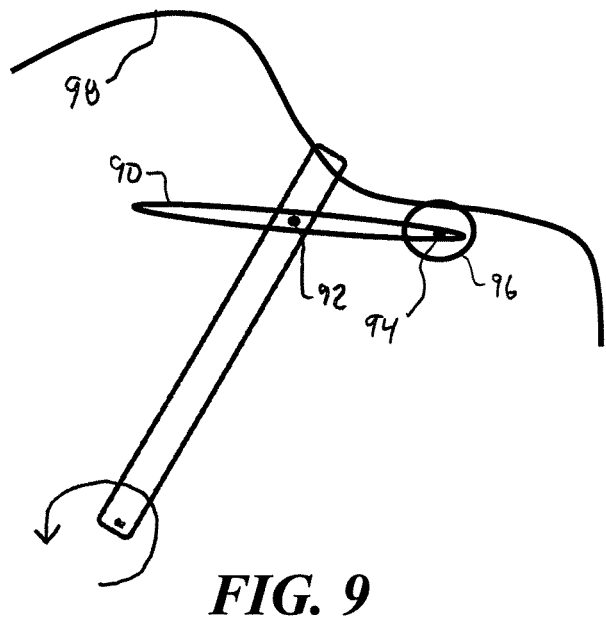
FIG. 9 is an exaggerated view of a cyclorotor blade, its pitching axis and its operative connection to its associated cam follower or cam follower.

Cyclorotor 810 includes three blades 812 mounted so that they can each freely rotate about a blade pitching axis 814. Each blade 812 is connected to a cam follower, or cam bearing, 816 (only one cam follower, or cam bearing, 816 is viewable in FIG. 8) mounted on a shaft 818 extending outward from each blade 812. As shown in FIG. 9, each cam follower 816 is connected to each blade 812 such that the axis of rotation 814 of each cam follower 812 is behind each corresponding axis of rotation 814 of each corresponding blade 812.

As centrifugal force from rotation of cyclorotor 810 forces each cam follower 816 against an inside cam surface 816 of a ring cam 820 sized slightly larger than cyclorotor 810, and as each cam follower 812 then moves in and out, following a cam profile defined by inside cam surface 822, it corresponding changes the pitch of its corresponding blade 812.

FIG. 9 is an exaggerated view of a cyclorotor blade 90, its pitching axis 92 and its operative connection 94 to its associated cam follower, or cam bearing, 96, better showing how movement of each cam follower 96 changes the pitch of its corresponding blade 90 as cam follower 96 and blade 90 rotate relative to an exaggerated cam surface profile 98.

At curtate advance ratios, each cam follower 96 creates a counterclockwise pitching moment, whereas at prolate advance ratios, each cam follower 96 creates blade pitching moments in both directions, depending on the position of blade 90. This allows centrifugal actuation to force each cam follower 96 against cam surface 98 at both curtate and prolate advance ratios.

As can now be seen, the shape of the inside surface 816 of a ring cam 800 can define a desired cam profile for a base pitching schedule especially suited for a particular flight condition.

The present invention is not limited, however, to a ring cam and ring cam assembly for a single cam profile suited for a single flight condition.

Inside cam surface 816 is shaped such that each cross-section along its perimeter is a different shape. Translating cam follower 812 along the rotational axis (x axis), or across inside cam surface 816, whether by moving cam surface 816, by moving cam follower 812 (or cam followers 812) or by moving both, causes cam followers 812 to follow one of an infinite number of cross sectional profiles. If ring cam 800 is centered on the x axis (y=z=0), then each cam cross sectional profile produces a base pitching schedule for a particular advance ratio (each x axis cam position corresponds to a different advance ratio). If implemented on a cyclogyro, each base pitching schedule can be designed to produce the aerodynamic forces necessary for equilibrium at a particular forward speed.

This ability to change pitch enables pitching kinematics to non-sinusoidally adapt for each operating advance ratio and enables both cyclic and collective pitch control.

At prolate advance ratios, the existence of 90 degree pitching angles will prevent movement of the cam perpendicular to the rotational axis. However, the nature of the required pitching schedules is such that the thrust can be increased or decreased by translating the cam along the x axis. The direction of the thrust can be changed by rotating the cam.

Those with skill in the relevant arts will easily see a variety of conventional actuators and other mechanisms for relative movement and rotation of the cam ring, cam followers and ring cam assembly.

Figure 10:
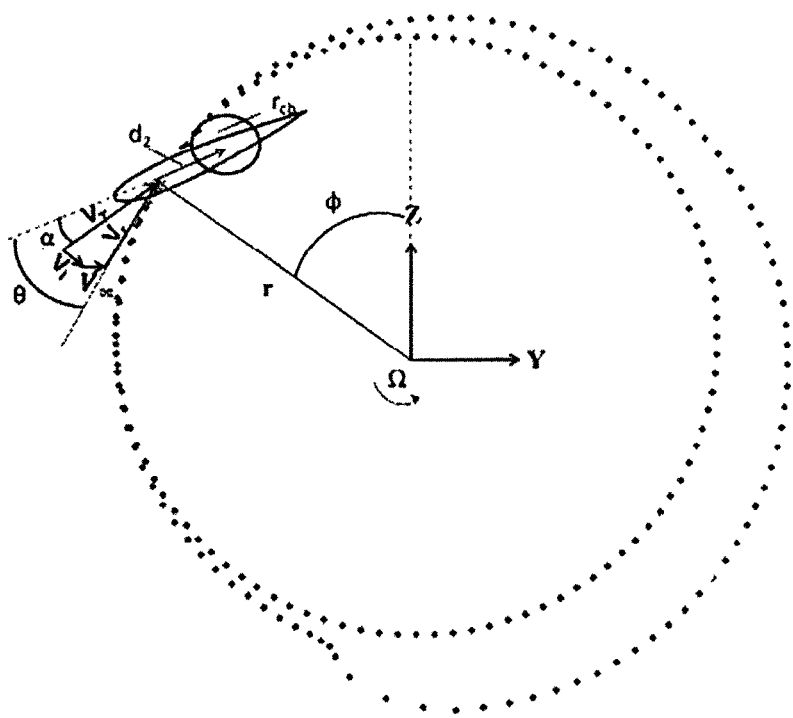
FIG. 10 shows a reference coordinate system for an example embodiment of a cyclorotor and ring cam assembly according to the teachings of the present invention.

FIG. 10 shows a reference coordinate system for an example embodiment cyclorotor and ring cam assembly according to the teachings of the present invention. Cyclic blade position is measured positive counterclockwise from the positive z axis ($\phi$). Blade pitch is measured positive clockwise from a blade path tangent line to the chord line ($\theta$). Rotation of the rotor is positive counterclockwise. Any base pitching schedule can be actuated by this control system, with certain limitations to the blade pitching rate, and base pitching schedules optimized to produce the forces required for numerous flight conditions.

As described in the first provisional patent application for the present invention, in an initial experiment, the cam and pitching schedule were designed such that the blades compensate for changes in advance ratio only. This pitching schedule is referred to as a zero angle of attack (ZAOA) pitching schedule.

A ZAOA pitching schedule is designed such that the neutral cam position (y=z=0) always produces a zero degree blade angle of attack at the quarter chord. Note that this pitching schedule will not result in zero resultant thrust. Friction on the blades and blade supporting components will create circulation in the air and the virtual camber effect (effective airfoil camber arises because curvilinear flow causes velocity to vary along the chord line) will create a resultant thrust. Each point in the pitching schedule is found by aligning the blade chord with the relative wind vector at the quarter chord location (VT). This ZAOA pitch angle is a function of blade cyclic position ($\phi$) and advance ratio ($\mu$). A derivation of equation (2) shown following is beyond the scope of this detailed description. Note that the arctangent in this equation is a four quadrant inverse tangent.

$$\theta(\phi, \mu) = \arctan\left(\frac{AR * \sin(\phi)}{AR * \cos(\phi) + 1}\right) \qquad (2)$$

Figure 11:
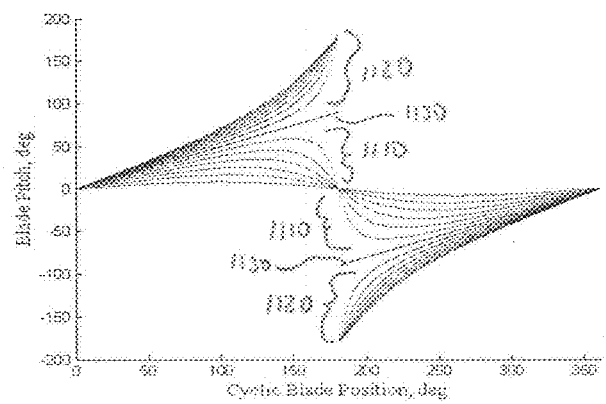
FIG. 11 is a graphical representation of a Zero Angle of Attack (ZAOA) pitching schedule for different advance ratios between one and two.

Equation (2) is plotted in FIG. 11 for different advance ratios between zero and two. At curtate advance ratios 1110, the blades pitch back and forth within 90 degrees of zero pitch (negative pitches are shown as larger positive pitches), while blade pitch monotonically increases at prolate advance ratios 1120. This causes the cam follower to always follow the leading edge of the blade at curtate advance ratios and alternate between following and preceding the blade at prolate advance ratios. Ideally, at an advance ratio of one 1130, a 180 degree pitch change is instantaneously required during rotation 1030. This pitch change indicates that a cam cannot produce an ideal pitching schedule near an advance ratio of one. The desired pitching schedules at each discrete advance ratio and $\phi$ value are mapped onto the discrete cross sectional shapes of the cam.

Figure 12:
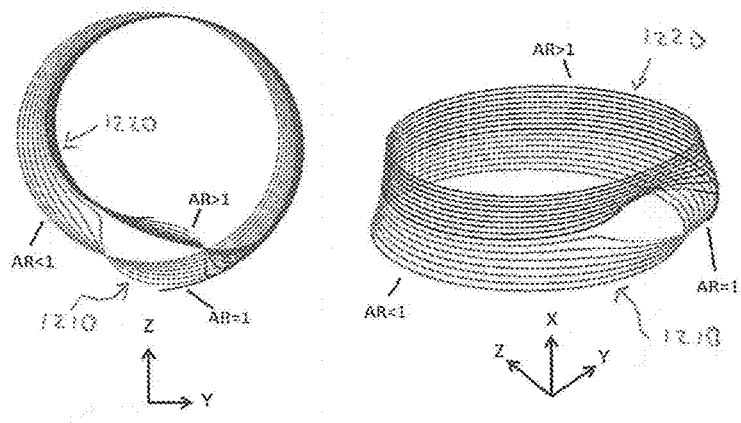
FIG. 12 shows an example embodiment of the inside cam surface of a ring cam at different cross sections according to the teachings of the present invention for a ZAOA pitching schedule.

FIG. 12 shows shapes of a cam at several different cross sections when designed for a ZAOA pitching schedule. At low curtate advance ratios 1210, the cam follower can easily follow the shape of the cam. At prolate advance ratios 1220, the cam follower follows a smooth path but must alternate between following and preceding the leading edge of the blade, as is indicated by blade pitch angles increasing above 180 degrees in FIG. 11. However, at advance ratios near one, the shape of the cam rapidly changes. At those advance ratios, the cam must be spatially filtered so that the cam follower does not "skip" off the cam. The cam shape must be designed such that centrifugal actuation is always sufficient to keep a cam follower pressed against the cam. After filtering, the cam comprises two continuous surfaces with a discontinuity corresponding to the transition between curtate and prolate advance ratios.

This ZAOA pitching schedule provides an immense improvement over sinusoidal pitching schedules at non-zero advance ratios, but is not optimum. Ideally, each base pitching schedule will produce the forces required for that particular flight condition and movement of the cam would only produce forces to change flight conditions or compensate for changes in vehicle mass. Future analysis and experimentation will determine optimal pitching schedules. A significant advantage of the teachings of the present invention is that it can produce virtually any base pitching schedule simply by using different cam shapes.

An experimental set up designed to test an example embodiment of the cyclorotor control mechanism is described in the first provisional patent application for this invention.

Those tests revealed that the cam follower shape introduces pitching error such that the original geometry could not achieve advance ratios greater than 0.7 due to mechanical interference. However, geometry modifications overcame these problems and successful operation was achieved at curtate advance ratios less than 0.85.

More recent modifications have achieved blade motions that monotonically increase pitch for prolate advance ratios and a mechanism that can produce prolate pitching schedules.

Figure 13:
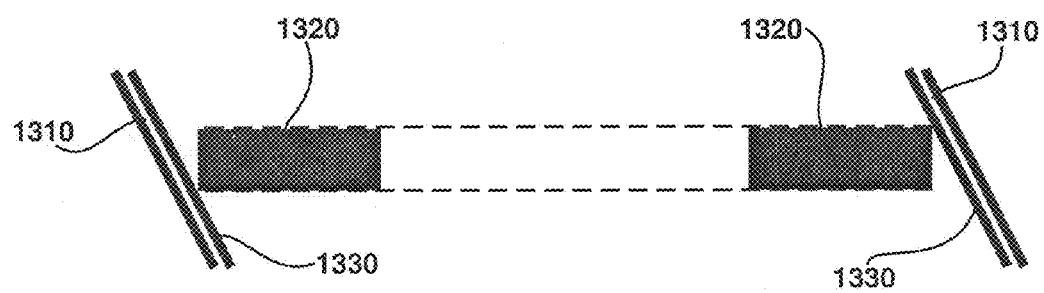
FIG. 13 is a cross-sectional view of a cam follower according to the teachings of the present invention exaggerated to show the cam follower running against both opposite sides of the inside of a ring cam at the same time.

As described in the first provisional patent application, successful operation of the mechanism was not achieved until various geometric design criteria were identified and corrected. As an example, the outer shape of the cam followers can cause a disparity in advance ratio tracking. FIG. 13 shows a cross section of a ring cam 1310 exaggerated in this view to show a cam follower 1320 running on both opposite inside surfaces 1330 of ring cam 1310 at the same time. The lofted cam shape 1330 slopes in the same direction on both sides of the cam, while cam follower 1320 runs along different sides of this slope. With a square cam follower profile, this slope causes the bearing to follow different cam cross sections and therefore advance ratios at different cyclic locations. At cyclic locations less than 180 degrees, cam follower 1320 follows a higher advance ratio as is depicted on the left hand side of FIG. 13. For the remainder of rotation, cam follower 1320 follows a lower advance ratio as shown on the right side of the same figure. This error in blade pitch can be corrected by making the cam follower profile narrow closer to a point at its end.

Both cyclic and collective control can be achieved, by the second primary configuration described in the Summary of the Invention, by moving ring cam 820 in two degrees of freedom perpendicular to a rotational axis along the Y and Z axes in FIG. 8. For example, moving ring cam 820 in the negative Z direction will increase the pitch of blades 812 on the upper portion of the cycle and decrease the pitch on the lower portion of the cycle, thus increasing the net force upward. Then, moving ring cam 820 in the positive Y direction will cause the location of maximum pitch to move counterclockwise about the rotational axis and continue to increase the absolute magnitude of the thrust. Translating ring cam 824 in two orthogonal directions changes the amplitude and phasing of cyclic pitching, thus respectively altering the magnitude and direction of the thrust vector.

These base pitching schedules can be altered in different ways for both curtate and prolate advance ratios in order to alter the magnitude and direction of the cyclorotor aerodynamic forces. At curtate advance ratios, the cam may be translated along the axes perpendicular to the rotational axis (y and z axes). This produces approximately sinusoidal deviations from the base pitching schedule. If implemented on a cyclogyro, a pilot or computer can move each cyclorotor cam in the y and z direction to alter cyclorotor aerodynamic forces. This will alter aircraft thrust and lift and, if multiple rotors were used, can create rolling, pitching and yawing moments. Changes in incoming free stream flow can be accounted for by rotating the cam about the x axis.

While the disclosed example embodiments of a ring cam and ring cam assembly are directed to dynamically controlling the pitch of cyclorotor blades, the original problem for which the invention was made, those with skill in the art will readily see that the disclosed ring cam and ring cam assembly will find use in many other areas where precise control, particularly dynamic control, of parts of mechanical systems is needed. The use of the disclosed invention is not limited, therefore, to cyclorotors.

Similarly, while the disclosed ring cam has a cam surface defining a plurality of adjacent cam profiles on the inside of the ring, other uses may require having a similar cam surface on the outside of the ring, or on shapes other than rings, but in all cases where the cam surface defines a plurality of different cam profiles which can be accessed by relative movement of the cam and cam follower.

Further, the example embodiments in this description show a ring cam diameter greater than the diameter of its corresponding cyclorotor. While believed to be a preferred embodiment, the ring cam diameter can be made the same size or smaller than its corresponding cyclorotor resulting in different sets of advantages and disadvantages as may be more appropriate for other uses.

Other patent applications will be filed for those other embodiments.

Various other modifications to the invention as described may be made, as might occur to one with skill in the art of the invention, within the scope of the claims. Therefore, all contemplated example embodiments have not been shown in complete detail. Other embodiments may be developed without departing from the spirit of the invention or from the scope of the claims.

I claim:

1. A ring cam, comprising a ring, having:
 (a) a perimeter about a center axis;
 (b) a width generally parallel with the center axis; and,
 (c) an inside cam surface, facing the center axis, defining a cam profile, wherein the cam profile varies along both the perimeter and the width.

2. The ring cam according to claim 1, wherein the inside cam surface defines a plurality of adjacent cam profiles across the width.

3. A ring cam assembly, comprising:
 (a) a ring, having:
  (i) a perimeter about a center axis;
  (ii) a width generally parallel with the center axis; and,
  (iii) an inside cam surface, facing the center axis, defining a cam profile,
  wherein the cam profile varies along both the perimeter and the width; and,
 (b) a cam follower for following the inside cam surface.

4. The ring cam assembly according to claim 3, wherein the inside cam surface defines a plurality of adjacent cam profiles across the width.

5. The ring cam assembly according to claim 4, wherein the cam follower is point-like where it contacts a cam profile.

6. A ring cam assembly for controlling the pitch of a cyclorotor blade of a cyclogyro, comprising:
 (a) a ring, having:
  (i) a perimeter about a center axis;
  (ii) a width generally parallel with the center axis; and,
  (iii) an inside cam surface, facing the center axis, defining a cam profile;
  wherein the cam profile varies along both the perimeter and the width; and,
 (b) a cam follower for following the inside cam surface, wherein the cam follower is operatively interconnected with the cyclorotor blade.

7. The ring cam assembly for controlling the pitch of a cyclorotor blade according to claim 6, wherein the inside cam surface defines a plurality of adjacent cam profiles across the width.

8. The ring cam assembly for controlling the pitch of a cyclorotor blade according to claim 7, wherein the cam follower is point-like where it contacts a cam profile.

9. The ring cam assembly for controlling the pitch of a cyclorotor blade according to claim 6, wherein the cyclorotor has an axis of rotation and the ring cam assembly is configured so that the ring center axis can be moved relative to the axis of rotation of the cyclorotor.

10. The ring cam assembly for controlling the pitch of a cyclorotor blade according to claim 6, wherein the cyclorotor has an axis of rotation and the ring cam assembly is configured so that the ring can be rotated about its center axis.

11. A method for controlling the movement of an apparatus part, comprising the steps of:
   (a) providing a ring cam, having:
      (i) a perimeter about a center axis;
      (ii) a width generally parallel with the center axis; and,
      (iii) an inside cam surface, facing the center axis, defining a cam profile, wherein the cam profile varies along both the perimeter and the width;
   (b) providing a cam follower for following the cam surface, wherein the cam follower is operatively connected to the apparatus part; and,
   (c) moving the cam follower across the cam surface to follow different cam profiles.

12. A method for controlling the pitch of a cyclorotor blade, comprising the steps of:
   (a) providing a ring cam, having:
      (i) a perimeter about a center axis;
      (ii) a width generally parallel with the center axis; and,
      (iii) an inside cam surface, facing the center axis, defining a cam profile, wherein the cam profile varies along both the perimeter and the width;
   (b) providing a cam follower for following the cam surface, wherein the cam follower is operatively connected to the cyclorotor blade; and,
   (c) moving the cam follower across the cam surface to follow different cam profiles.

* * * * *